(12) United States Patent
Nakanaga

(10) Patent No.: US 7,062,255 B2
(45) Date of Patent: Jun. 13, 2006

(54) MOBILE TELEPHONE SYSTEM

(75) Inventor: Isao Nakanaga, Tokyo (JP)

(73) Assignee: NEC Corporation, Tokyo (JP)

( * ) Notice: Subject to any disclaimer, the term of this patent is extended or adjusted under 35 U.S.C. 154(b) by 564 days.

(21) Appl. No.: 10/270,353

(22) Filed: Oct. 15, 2002

(65) Prior Publication Data
US 2003/0083100 A1    May 1, 2003

(30) Foreign Application Priority Data
Oct. 15, 2001    (JP) .............. 2001-316433

(51) Int. Cl.
*H04M 11/00*    (2006.01)
(52) U.S. Cl. ............ 455/412.1; 709/219; 715/513; 719/328
(58) Field of Classification Search ........... 455/412.1, 455/412.2, 414.1; 709/219; 719/328; 715/513; 725/513
See application file for complete search history.

(56) References Cited

U.S. PATENT DOCUMENTS

| | | | |
|---|---|---|---|
| 5,812,776 A | 9/1998 | Gifford | |
| 5,945,989 A | 8/1999 | Freishtat et al. | |
| 6,742,024 B1 * | 5/2004 | Ono | ............ 709/219 |
| 2001/0008555 A1 | 7/2001 | Bae et al. | |
| 2001/0039592 A1 * | 11/2001 | Carden | ............ 709/245 |
| 2001/0043273 A1 * | 11/2001 | Herrod et al. | ............ 348/220 |
| 2002/0046349 A1 * | 4/2002 | Saito | ............ 713/201 |

FOREIGN PATENT DOCUMENTS

| | | |
|---|---|---|
| CN | 1311601 A | 9/2004 |
| EP | 1 122 656 A3 | 7/2003 |
| GB | 2 347 328 A | 8/2000 |
| JP | 2001-142820 A | 5/2001 |
| WO | WO 01/52484 A1 | 7/2001 |
| WO | WO 01/52487 A1 | 7/2001 |
| WO | WO 01-52487 A1 | 7/2001 |

* cited by examiner

*Primary Examiner*—Lee Nguyen
(74) *Attorney, Agent, or Firm*—Sughrue Mion, PLLC

(57) ABSTRACT

A mobile telephone system provides a dedicated WEB area to a mobile telephone set with a browsing function. The mobile telephone system has a WEB server which includes the WEB area, and an HP forming auxiliary server which builds an HP directory file based on an information input from the mobile telephone set and uploads the HP directory file to the WEB area of the WEB server.

28 Claims, 6 Drawing Sheets

MOBILE TELEPHONE SYSTEM

FIELD OF THE INVENTION

The present invention relates to a mobile telephone system which provides a dedicated WEB are to a mobile telephone set having a browsing function and, more particularly, to a mobile telephone system which can manage a dedicated WEB area provided to a mobile telephone set having a browsing function with a simple operation.

BACKGROUND OF THE INVENTION

In recent years, the Internet has been used as a communication tool which transmits information on a personal HP (homepage). Furthermore, a mobile telephone set (to be referred to as a browser phone hereinafter) having a browsing function has been popularly used. A user can browse homepages at any place.

However, in a conventional art, in order to have a WEB site, an environment of a personal computer (PC) or the like and a contract for WEB area hosting service are required. When a WEB site for a browser phone is to be built, an environment of a PC or the like, software for building a WEB site, and a contract for WEB area hosting service are necessary disadvantageously.

SUMMARY OF THE INVENTION

The present invention has been made in consideration of the circumstances, and has as its object to provide a mobile telephone system which can easily build a WEB site by using a browser phone without a contract for new WEB area hosting service, an environment of a PC or the like, and a knowledge of WEB.

The present invention has the following configuration to solve the problem.

The first aspect of the present invention provides a mobile telephone system which provides a dedicated WEB area to a mobile telephone set having a browsing function, including a WEB server in which the WEB area is secured; and an HP forming auxiliary server for building an HP directory file based on an information input from the mobile telephone set to upload the HP directory file to the WEB area of the WEB server.

The second aspect of the present invention provides a mobile telephone system wherein the HP forming auxiliary server includes ID detection means for detecting an ID of the mobile telephone set and ID determination means for determining whether the ID detected by the ID detection means is an ID which is registered in advance or not, and accepts only an information input from the mobile telephone set the ID of which is determined as the ID registered in advance by the ID determination means.

The third aspect of the present invention provides a mobile telephone system wherein the WEB server accepts only upload from the HP forming auxiliary server.

The fourth aspect of the present invention provides a mobile telephone system wherein the HP forming auxiliary server causes a phone seller to prepare an advertisement as an HP material and causes a phone purchaser to select the presence/absence of arrangement of the advertisement in formation of an HP directory file based on the information input from the mobile telephone set.

The fifth aspect of the present invention provides a mobile telephone system including a mail server in which an HP forming mail address for accepting a mail for designating formation of the HP directory file is predetermined, wherein the HP forming auxiliary server builds the HP directory file based on a mail addressed to the HP forming mail address of the mail server to upload the HP directory file to the WEB area of the WEB server.

The sixth aspect of the present invention provides a mobile telephone system including database means in which an HP material depending on the machine type of the mobile telephone set is, stored, wherein the HP forming auxiliary server causes the database means to check the machine type of the mobile telephone set and calls an HP material corresponding to the machine type of the mobile telephone set from the database means to provide the HP material to the mobile telephone set.

The seventh aspect of the present invention provides a mobile telephone system including a URL searching server for storing the ID of the mobile telephone set and a URL of the WEB area as a pair and returning the URL of the WEB area in response to an access made by using the ID of the mobile telephone set as a key.

The eighth aspect of the present invention provides a mobile telephone system including an HP information conversion server for converting a first HP directory file read from the WEB server into a second HP directory file having description language information and image format information which are different from those of the first HP directory file.

The ninth aspect of the present invention provides a WEB area providing method in a mobile telephone system which provides a dedicated WEB area to a mobile telephone set having a browsing function, wherein the WEB area is secured on a WEB server, and an HP is built by an HP forming auxiliary server based on an information input from the mobile telephone set to upload the HP to the WEB sever.

The tenth aspect of the present invention provides a WEB area providing method wherein the HP forming auxiliary server detects the ID of the mobile telephone set, determines whether the detected ID is an ID registered in advance or not, and accepts only an information input from the mobile telephone set the ID of which is determined as the ID registered in advance.

The eleventh aspect of the present invention provides a WEB area providing method wherein the WEB server accepts only upload from the HP forming auxiliary server.

The twelfth aspect of the present invention provides a WEB area providing method wherein the HP forming auxiliary server prepares an advertisement as an HP material and selectively arranges the advertisement in formation of an HP directory file based on the information input from the mobile telephone set.

The thirteenth aspect of the present invention provides a WEB area providing method wherein an HP forming mail address for accepting a mail for designating formation of an HP directory file is preset in the mail server, and the HP forming auxiliary server builds the HP directory file based on a mail addressed to the HP forming mail address of the mail server to upload the HP directory file to the WEB area of the WEB server.

The fourteenth aspect of the present invention provides a WEB area providing method wherein an HP material corresponding to a machine type of the mobile telephone set is stored in database means, and the HP forming auxiliary server calls the HP material corresponding to the machine type of the mobile telephone set from the database means to provide the HP material to the mobile telephone set.

The fifteenth aspect of the present invention provides a WEB area providing method wherein the ID of the mobile telephone set and a URL of the WEB area are stored as a pair in a URL searching server, and the URL searching server returns the URL of the WEB area in response to an access made by using the ID of the mobile telephone set as a key.

The sixteenth aspect of the present invention provides a WEB area providing method wherein a first HP directory file read from the WEB server is converted by an HP information conversion server into a second HP directory file having description language information and image format information which are different from those of the first HP directory file.

DETAILED DESCRIPTION OF THE PREFERRED EMBODIMENTS

Embodiments of the present invention will be described below with reference to the accompanying drawings.

(First Embodiment)

Figure 1:
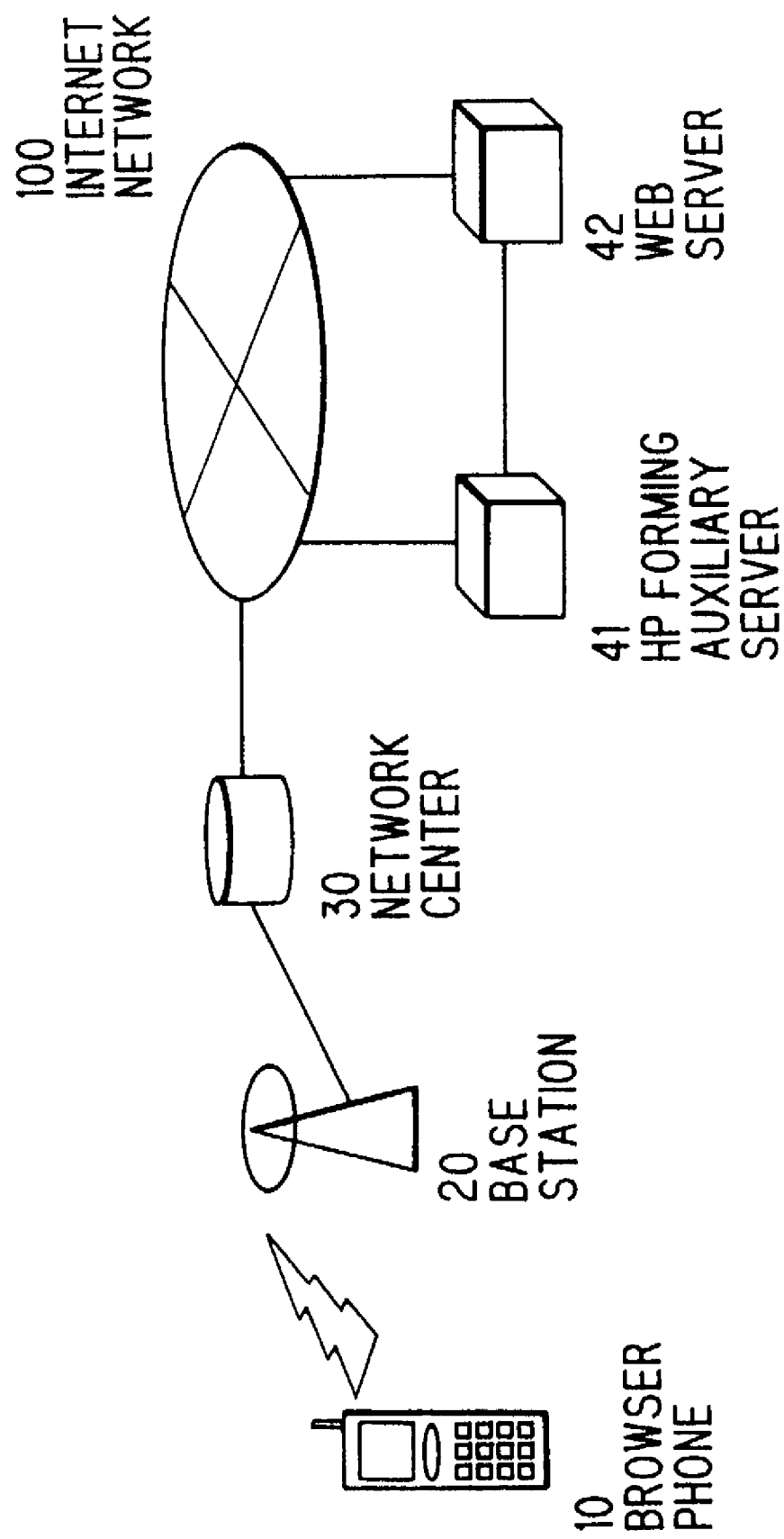
FIG. 1 is a system diagram of the first embodiment of a mobile telephone system according to the present invention.

FIG. 1 is a system diagram of the first embodiment of a mobile telephone system according to the present invention.

The first embodiment is constituted by a mobile telephone set 10 (to be referred to as a browser phone 10 hereinafter) having a browsing function, a base station 20, a network center 30, an internet network 100, a HP forming auxiliary server 41, and the WEB server 42. The HP forming auxiliary server 41 and the WEB server 42 are managed by a seller.

The browser phone 10 is a mobile telephone set having a browsing function that can browse homepages (HP) provided on the internet network 100. The browser phone 10 has a function that connects the browser phone to the internet network 100 through the base station 20 and the network center 30 and a function that accesses the HP forming auxiliary server 41 and the WEB server 42 through the internet network 100 to transmit/receive various pieces of information between the HP forming auxiliary server 41 and the WEB server 42.

The HP forming auxiliary server 41 has a function that builds an HP directory file in response to an information input from the browser phone 10 and uploads the HP directory file to the WEB server 42. More specifically, the HP forming auxiliary server 41 holds configurations of the basic HPs and plural types of patterns of applied images of the basic HPs, and has a function that sets a text input frame (character string input area) on an HP, a function that converts position designation text information input by designating a position from the browser phone 10 into information in an HP description language such as HTML to build a directory file and uploads the directory file to the WEB server 42, and a function that builds an HP directory file from an image (illustration, pictographic characters, or the like), except for a text, the position of which is designated and which is designated to be inserted to upload the HP directory file to the WEB server 42. The HP forming auxiliary server 41 also holds information of basic CGIs such as a "bulletin board system" or a "counter", and has a function that builds a directory by using a CGI in response to an information input from the browser phone 10.

The HP forming auxiliary server 41 transmits an HP forming screen which a screen for accepting an information input from the browser phone 10 in response to an access from the browser phone 10, and accepts the information input from the browser phone 10.

The WEB server 42 has a function that accepts upload from the HP forming auxiliary server 41 and places an HP directory file in a WEB area for the browser phone 10. The WEB server 42 transmits an HP screen to the browser phone 10 in response to an access from the browser phone 10 through the internet network 100.

An operation of the first embodiment will be described below with reference to FIG. 2.

Figure 2:
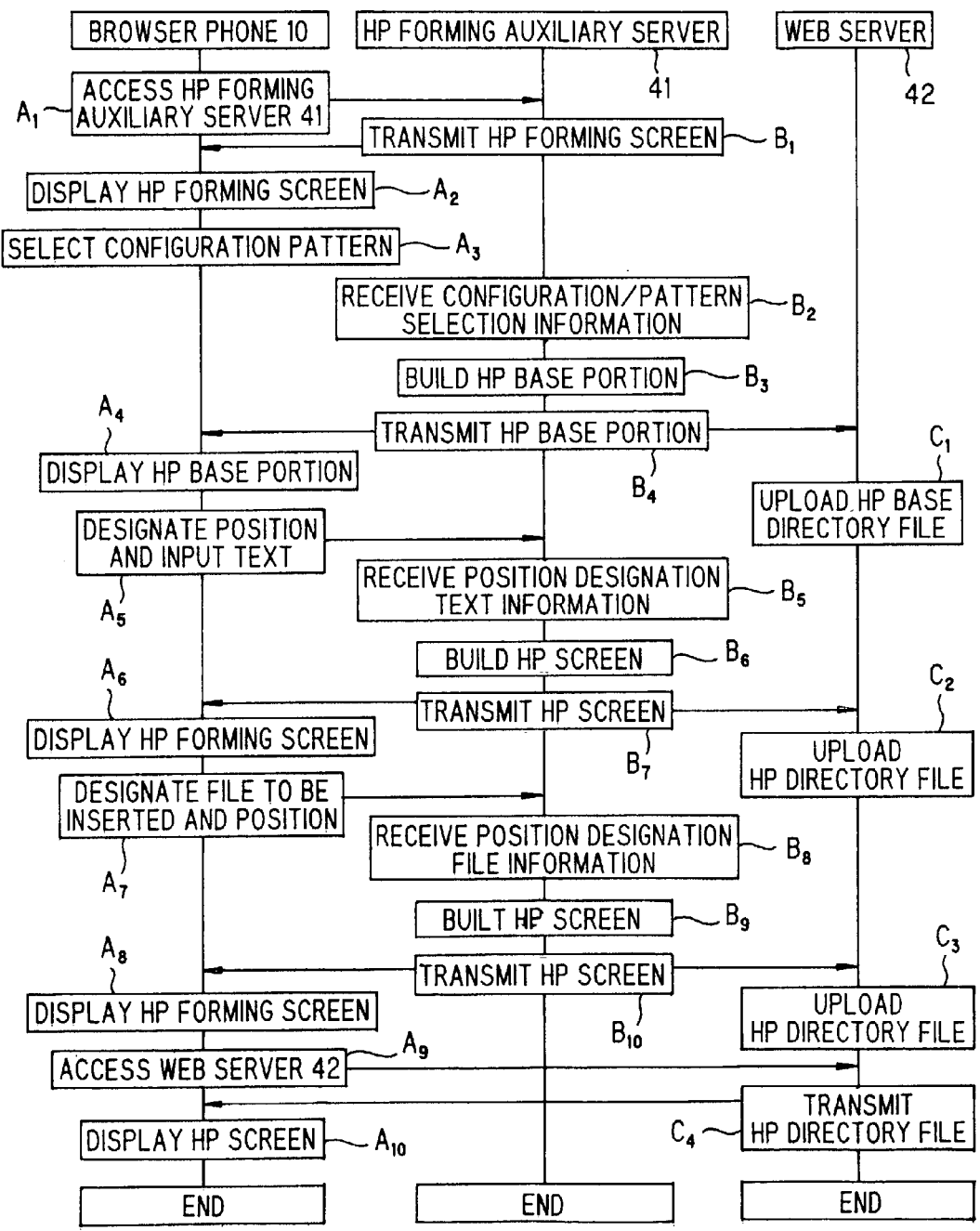
FIG. 2 is a diagram showing an HP forming operation of the first embodiment of the mobile telephone system according to the present invention.

FIG. 2 is a diagram showing an HP forming operation of the first embodiment of the mobile telephone system according to the present invention.

A seller (manufacturer, entrepreneur, sales subsidiary, or the like) of the browser phone 10 secures a WEB area for the browser phone 10 to be sold on the WEB server 42 and prepares an HP forming screen on used for uploading a homepage in the WEB area for the browser phone 10 secured on the WEB server 42. In the browser phone 10, a WEB address which is a URL for designating the WEB are for the browser phone 10 secured on the WEB server 42 and an HP forming screen address which is a URL for designating the HP forming screen prepared in the HP forming auxiliary server 41 are preset.

By a browser phone purchaser who purchases the browser phone 10, based on a preset HP forming screen, the HP forming auxiliary server 41 is accessed from the browser phone 10 through the base station 20, the network center 30, and the internet network 100 (step A1).

The HP forming auxiliary server 41 transmits an HP forming screen to the browser phone 10 in response to an access from the browser phone 10 (step B1), and the HP forming screen is displayed on the browser phone 10 (step A2).

When a new HP is to be formed, the browser phone purchaser selects a configuration the HP and the pattern of an applied image on the HP forming screen (step A3) and clicks a transmission button on the HP forming screen to transmit configuration/pattern selection information from the browser phone 10 to the HP forming auxiliary server 41. The configuration of the HP means a page configuration of an HP such as the positions of character string input areas, the number of character string input areas, the presence/absence of a multiple column, and the like. The pattern of an applied image means a background of the HP.

When the HP forming auxiliary server 41 receives the configuration/pattern selection information from the browser phone 10 (step B2), the HP forming auxiliary server 41 builds an HP base portion (directory file of the top page of an HP) based on the configuration/pattern selection information (step B3) and transmits the built HP base portion to the WEB server 42 (step B4). The HP base portion is uploaded as an HP base directory file into the WEB area for the browser phone 10 of the WEB server 42 (step C1).

The HP forming auxiliary server 41 transmits the built HP base portion to the browser phone 10 (step B4), and the HP base portion built by the HP forming auxiliary server 41 is displayed on the browser phone 10 (step A4). The browser phone purchaser can confirm the built HP base portion.

When a text such as a character string or the like is to be input, the text is input after a position where the text is inserted on the HP forming screen (step A5), and a transmission button on the HP forming screen is clicked, so that position designation text information is transmitted from the browser phone 10 to the HP forming auxiliary server 41.

The HP forming auxiliary server 41 receives the position designation text information from the browser phone 10 (step B5) and converts the position designation text information into information in HTML or the like to build an HP screen (HP directory file) (step B6). The built HP screen is transmitted to the WEB server 42 (step B7), and the HP screen is uploaded as an HP directory file to the WEB area for the browser phone 10 of the WEB server 42 (step C2).

The HP forming auxiliary server 41 also transmits the built HP screen to the browser phone 10 (step B7). The HP screen built by the HP forming auxiliary server 41 is displayed on the browser phone 10 (step A6). The browser phone purchaser can confirm the built HP screen.

When a file is inserted, a file to be inserted on the HP forming screen and a position into which the file is inserted are designated (step A7), and a transmission button on the HP forming screen is clicked, so that position designation file information is transmitted from the browser phone 10 to the HP forming auxiliary server 41.

The HP forming auxiliary server 41 receives the position designation file information from the browser phone 10 (step B8) and converts the position designation file information into information in HTML or the like to build an HP screen (HP directory file) (step B9). The HP forming auxiliary server 41 transmits the built HP screen to the WEB server 42 (step B10) The HP screen is uploaded as an HP directory file to the WEB area for the browser phone 10 of the WEB server 42 (step C3).

The HP forming auxiliary server 41 also transmits the built HP screen to the browser phone 10 (step B10). The HP screen built by the HP forming auxiliary server 41 is displayed on the browser phone 10 (step A8). The browser phone purchaser can confirm the built HP screen.

When the HP screen uploaded onto the WEB server 42 is to be confirmed, by an operation of the browser phone purchaser who purchases the browser phone 10, based on a preset WEB address, the WEB server 42 is accessed from the browser phone 10 through the base station 20, the network center 30, and the internet network 100 (step A9). The WEB server 42 transmits the HP directory file to the browser phone 10 in response to the access from the browser phone 10 (step C4), and the HP screen is displayed on the browser phone 10 (step A10).

After the WEB site is built, the browser phone purchaser discloses her/his URL address (URL for designating the WEB area for the browser phone 10 secured on the WEB server 42) by a mail or the like from the browser phone 10, so that building contents are popularly provided to the concerned parties and the public.

As described above, according to the first embodiment, the WEB area for the browser phone 10 is secured on the WEB server 42, and an HP can be formed by using the HP forming auxiliary server 41. For this reason, a WEB site can be easily built without a contract for new WEB area hosting service, an environment of a PC or the like, building software, and a knowledge of WEB, advantageously.

An advertisement (banner advertisement or the like) provided by a browser phone seller as a configuration of an HP may be prepared in the HP forming auxiliary server 41, so that the presence/absence of an arrangement of the advertisement in the HP can be selected from the HP forming screen in formation of an HP by a browser phone purchaser. When the advertisement is arranged in the HP, enlargement of the WEB area of the browser phone 10, discounts of communication charge of the browser phone 10, and the like can be provided as services depending on the number of accesses to the HP of the WEB server 42, the number of clicks of the advertisement, and the like.

In addition, the HP forming auxiliary server 41 is given with a function that detects a unique ID (telephone number) of the browser phone 10, and is caused to accept an information input from the browser phone 10 having a registered ID, so that a built HP screen is uploaded to a WEB address corresponding to the registered ID. The WEB server 42 is constituted to accept only upload from the HP forming auxiliary server 41. For this reason, the built HP on the WEB server 42 can be prevented from being dishonestly altered by the third party.

(Second Embodiment)

Figure 3:
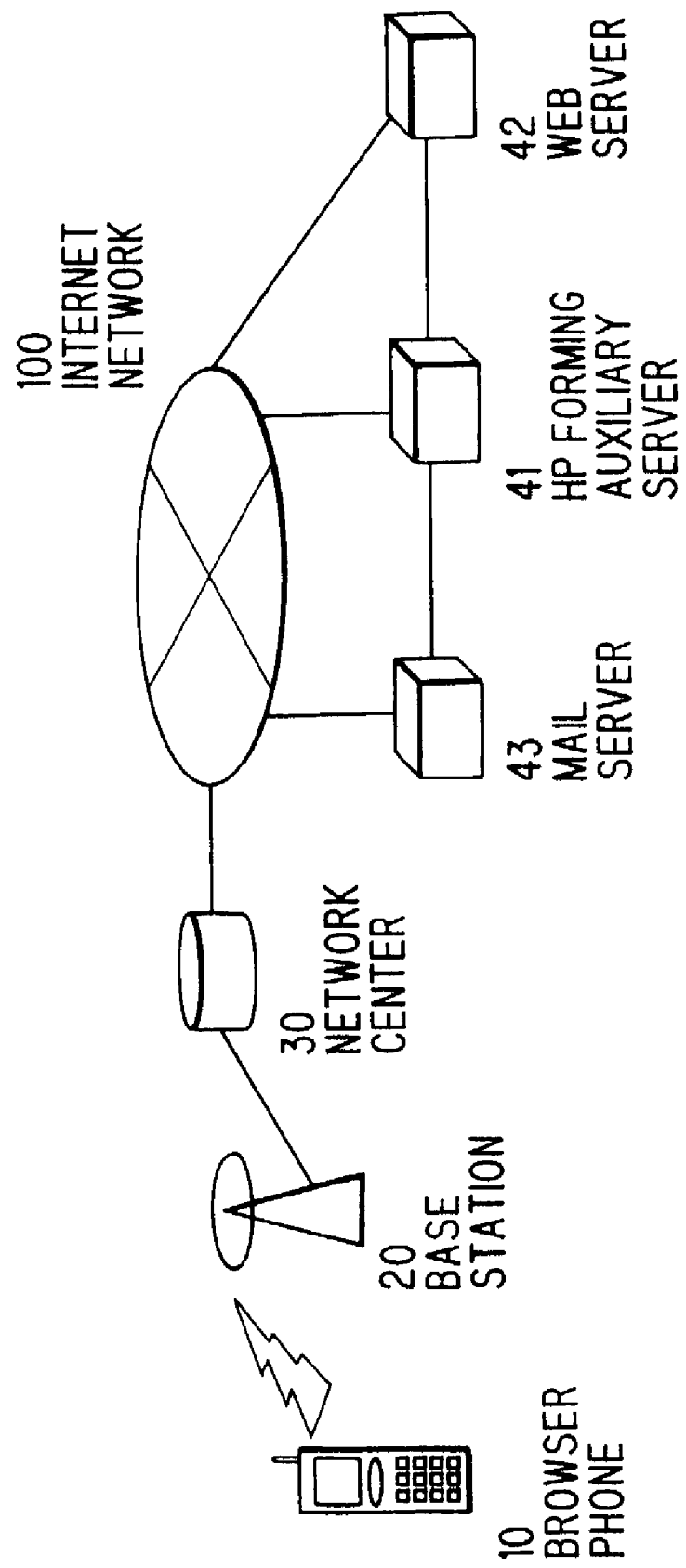
FIG. 3 is a system diagram of the second embodiment of a mobile telephone system according to the present invention.

FIG. 3 is a system diagram of the second embodiment of a mobile telephone system according to the present invention.

In the second embodiment, a mail server 43 is added to the configuration of the first embodiment. In the mail server 43, an HP forming mail address which accepts a mail for designating formation of an HP for the browser phone 10 is predetermined.

When image and music files are to be added and updated on the HP, a mail to which image and music files to be placed are attached and which designates a position where the attached image and music files are inserted is transmitted from the browser phone 10 to a mail address for forming an HP. The HP forming auxiliary server 41 periodically accesses the mail server 43 to check whether a mail arrives at the mail address for forming an HP or not. When the mail arrives at the address, an HP screen is built and uploaded to the WEB server 42.

In addition to mail transmission using a mailer of the browser phone 10, mail transmission is performed to a mail address for forming an HP by using a mailer of a personal computer or the like, so that image and music files attached to the HP can be placed. However, in order to prevent the HP from being indiscriminately updated, a source mail address is registered in the HP forming auxiliary server 41 in advance. Only when a mail addressed to a mail address for forming an HP is transmitted from the source mail address, an HP screen is previously built and uploaded to the WEB server 42.

In the second embodiment, addition and updating of an HP by using a mail are not performed by only uploading image and music files. Various designations for forming an HP to the HP forming auxiliary server 41, i.e., designations of the configuration of the HP and information of an applied image pattern or the like, and instructions (generation, correction, and deletion of HP contents) are performed by mail transmission from the browser phone 10 (information described in a mail received by the mail server 43 is converted into information for forming an HP by the mail server 43).

As described above, according to the second embodiment, an HP can be added and updated by only mail transmission using a mailer without using a browser of the browser phone 10. The HP can be easily added and updated advantageously.

(Third Embodiment)

Figure 4:
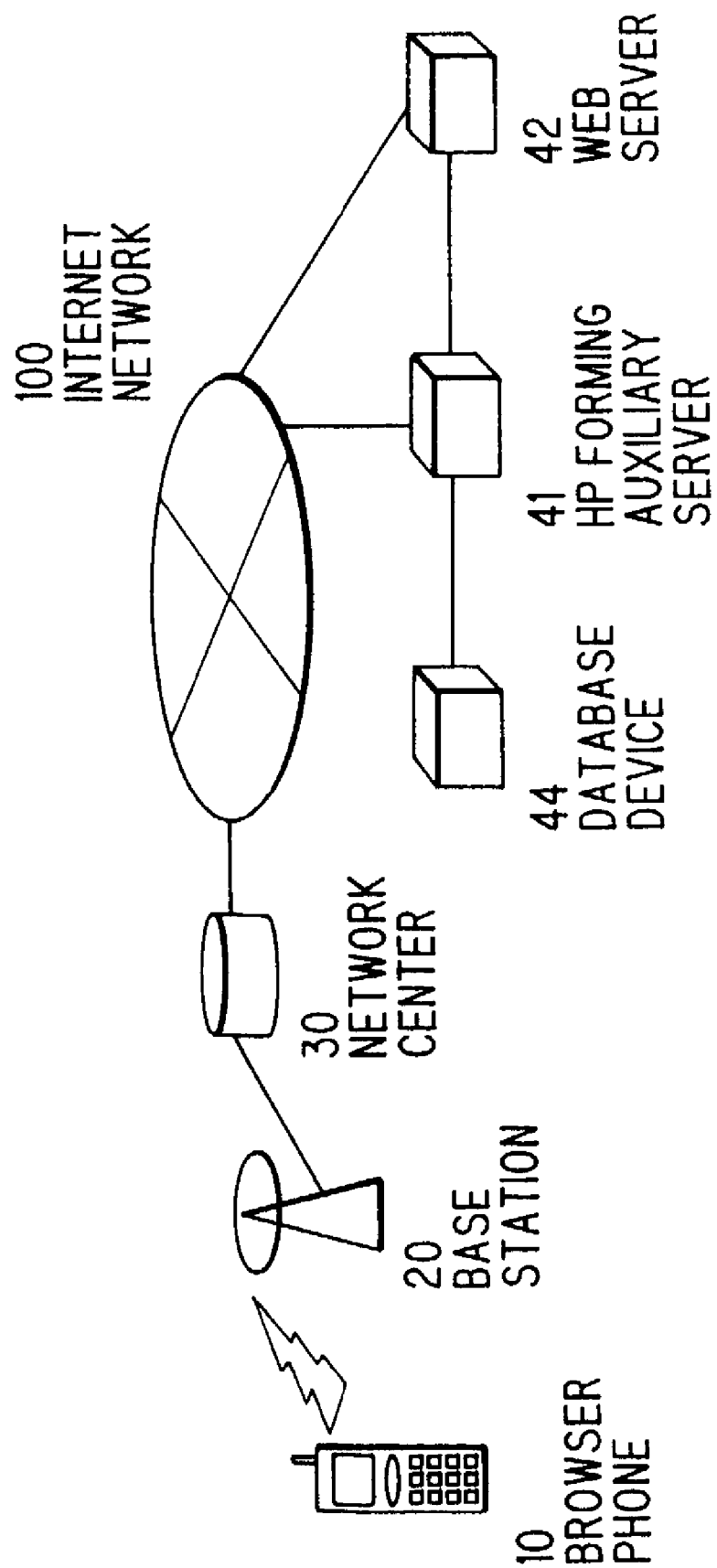
FIG. 4 is a system diagram of the third embodiment of a mobile telephone system according to the present invention.

FIG. 4 is a system diagram of the third embodiment of a mobile telephone system according to the present invention.

In the third embodiment, a database device 44 is added to the configuration of the first embodiment. In the database device 44, a machine type (specifications, patron base, machine type concept, or the like) and a predetermined HP material depending on the machine type of the browser phone 10 are stored.

When the HP forming auxiliary server 41 accepts an access from the browser phone 10, the HP forming auxiliary server 41 checks the machine type of the browser phone 10 notifies the database device 44 of the machine type of the browser phone 10. The database device 44 transmits a predetermined HP material depending on the machine type of the browser phone 10 to the HP forming auxiliary server 41, and the HP forming auxiliary server 41 provides the HP material received from the database device 44 to the browser phone 10.

The HP material is not always performed by the database device 44 depending on the machine type of the browser phone 10. A predetermined HP material depending on an input of browser phone purchaser information (obtained by a questionnaire or the like; age, sex, taste, or the like) when or after the browser phone is purchased may be provided. In this case, a data table which correlates the browser phone purchaser information with HP materials is prepared in the database device 44 to determine an HP material to be provided.

As described above, according to the third embodiment, HP materials corresponding to specifications such as music information processing capability, image information display capability, and a communication speed, a target patron base, a machine type concept, and the like can be selectively provided. A browser phone purchaser can smoothly form an HP advantageously.

(Fourth Embodiment)

Figure 5:
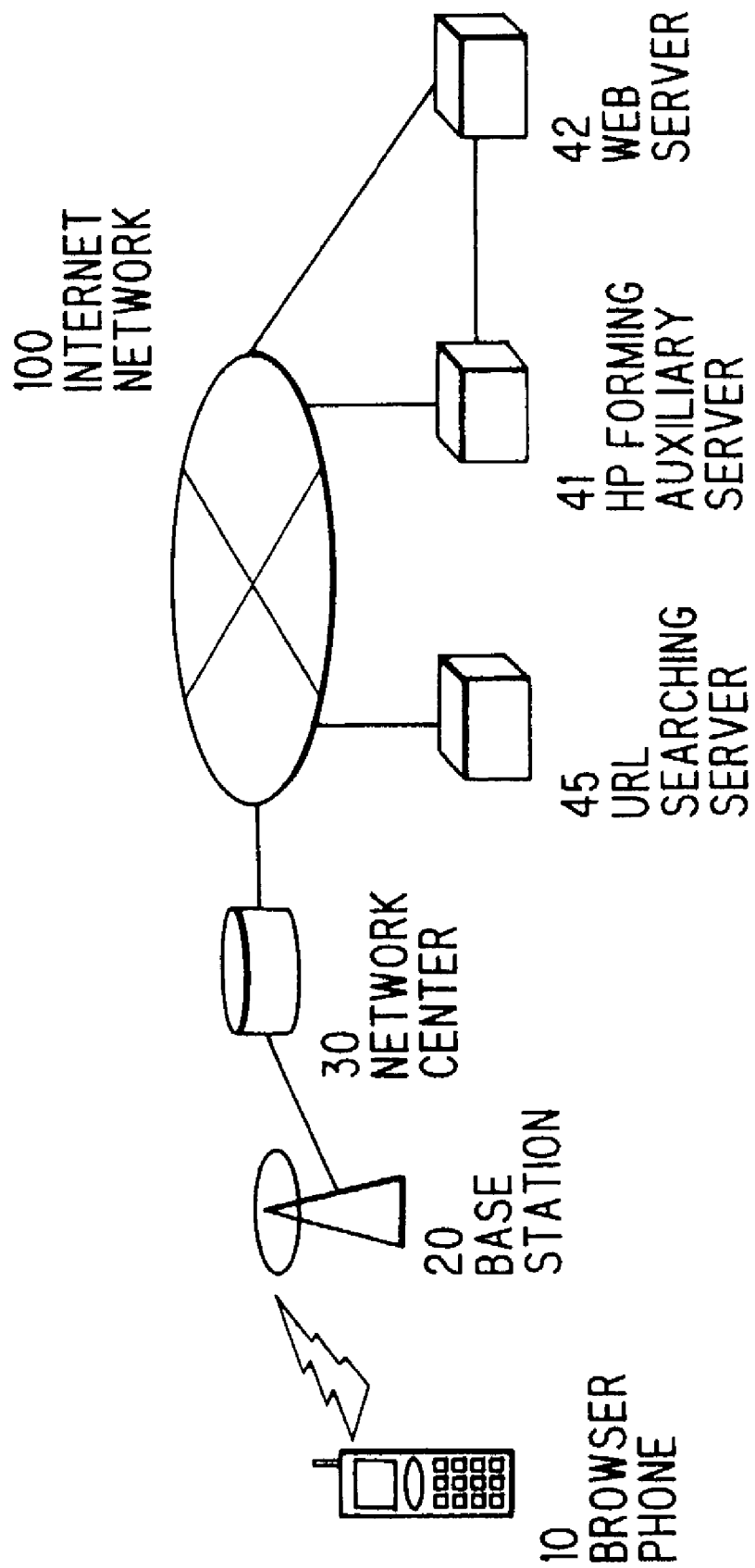
FIG. 5 is a system diagram of the fourth embodiment of a mobile telephone system according to the present invention.

FIG. 5 is a system diagram of the fourth embodiment of a mobile telephone system according to the present invention.

In the fourth embodiment, a URL searching server 45 is added to the configuration of the first embodiment. The URL searching server 45 stores an ID (telephone number/mail address or the like) of the browser phone 10 and a URL (WEB address) of a WEB area as a pair.

When a person other than a browser phone purchaser accesses the URL searching server 45 by using the ID (telephone number) of the browser phone 10, the URL searching server 45 returns the presence/absence of establishment of an HP of a purchaser of the browser phone 10 and the URL of the established HP.

As described above, according to the fourth embodiment, after a WEB site is built, a browser phone purchaser need not notify concerned parties of her/his URL address by a mail or the like of the browser phone. A person who knows the ID of the browser phone 10 can advantageously know the URL of an established HP with a simple operation.

(Fifth Embodiment)

Figure 6:
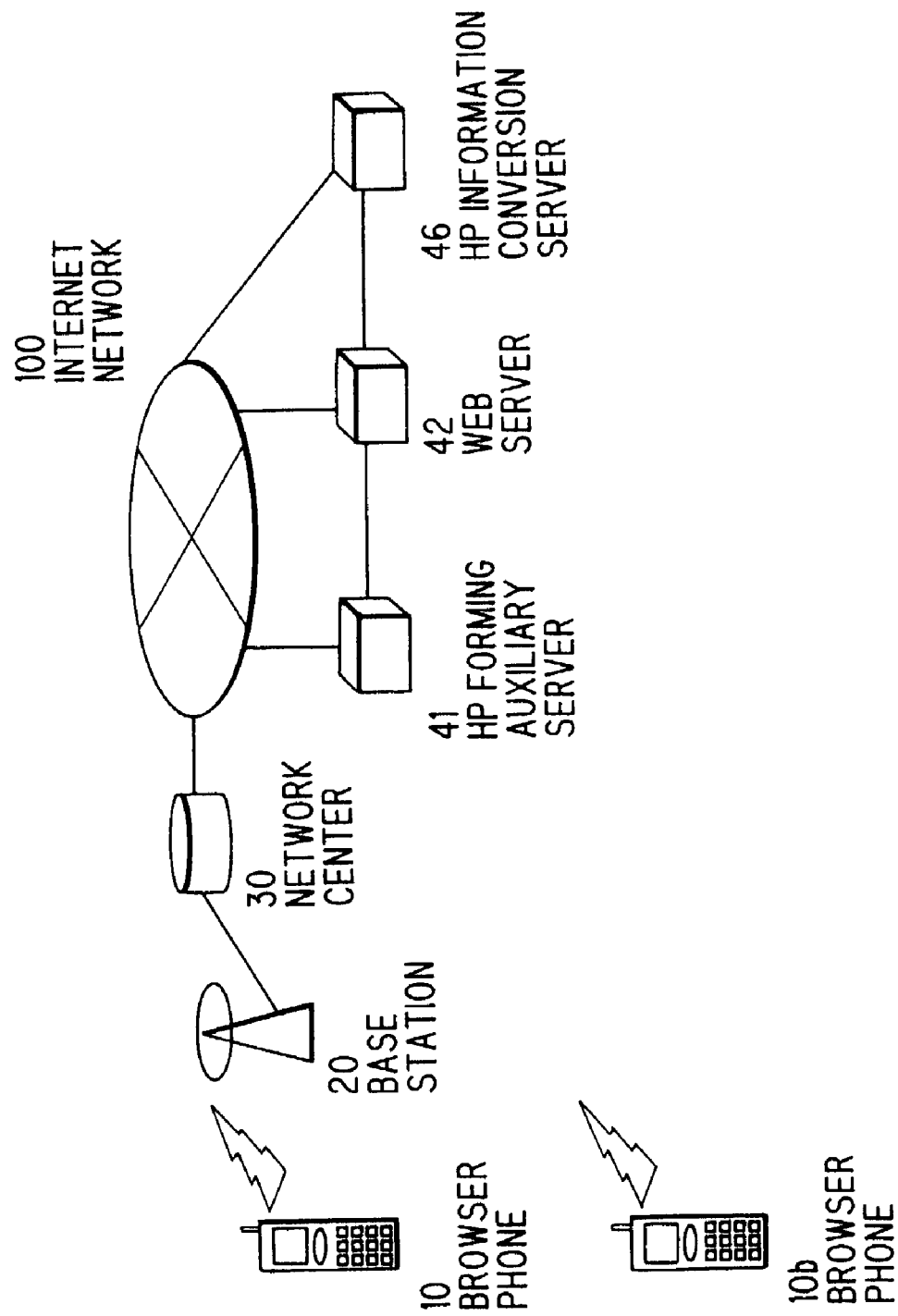
FIG. 6 is a system diagram of the fifth embodiment of a mobile telephone system according to the present invention.

FIG. 6 is a system diagram of the fifth embodiment of a mobile telephone system according to the present invention.

In the fifth embodiment, an HP information conversion server 46 is added to the configuration of the first embodiment. The HP information conversion server 46 has a function that converts an HP directory file (description language information, image format information, and the like) and selective information input information selectively input in formation of an HP.

The HP information conversion server 46 reads a first HP directory file (first description language information, first image format information, and the like) from the WEB server 42 through the HP forming auxiliary server 41 by a designation from the browser phone 10, converts the first HP directory file into an arbitrary second HP directory file (second description language information, second image format information, and the like) different from the first HP directory file, and uploads the converted second HP directory file to the WEB server 42 through the HP forming auxiliary server 41. The HP information conversion server 46 also converts the selective information input information which is selectively input in formation of the HP such that the selective information input information is matched to the second HP directory file.

As described above, according to the fifth embodiment, even though the browser phone 10 (the WEB function of which corresponds to the first description language information and the first image format information) which is purchased at first is replaced with a different browser phone 10b (the WEB function of which corresponds to the second description language information and the second image format information), an HP corresponding to the browser phone 10b is not formed from the beginning, and an HP (second HP directory file) corresponding to the browser phone 10b can be advantageously formed by using a first HP directory file formed when the browser phone 10 is purchased or selective information input information for forming an HP.

The present invention is not limited to the above embodiments, and various changes and modifications of the embodiment are effected without departing from the spirit and scope of the invention, as a matter of course. The number, positions, shapes, and the like of the constituent elements are not limited to those in the embodiments. The number, positions, shapes, and the like of the constituent elements which are preferable to carry out the present invention can be employed. The same reference numerals as in the respective drawings denote the same parts in the drawings.

The mobile telephone system according to the present invention has the following advantage. That is, a WEB area for a browser phone can be secured on a WEB server, and an HP can be formed by using an HP forming auxiliary server. For this reason, a WEB site can be easily built without a contract for new WEB area hosting service, an environment of a PC or the like, building software, and a knowledge of WEB.

Furthermore, the mobile telephone system according to the present invention has the following advantage. That is, an HP can be added and updated by only mail transmission using a mailer without using a browser of a browser phone, and the HP can be easily added and updated.

Still furthermore, the mobile telephone system according to the present invention has the following advantage. HP materials corresponding to specifications such as music information processing capability, image information display capability, and a communication speed, a target patron base, a machine type concept, and the like can be selectively provided. A browser phone purchaser can smoothly form an HP.

Still furthermore, the mobile telephone system according to the present invention has the following advantage. That is, after a WEB site is built, a browser phone purchaser need not notify concerned parties of her/his URL address by a mail or the like of the browser phone. A person who knows the ID of the browser phone can know the URL of an established HP with a simple operation.

Still furthermore, the mobile telephone according to the present invention, even though a browser phone (the WEB function of which corresponds to first description language information and first image format information) which is purchased at first is replaced with a new browser phone (the WEB function of which corresponds to second description language information and second image format information), an HP corresponding to the new browser phone is not formed from the beginning, and an HP corresponding to the new browser phone can be formed by using the HP directory file which has been formed and selective information input information for forming an HP.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A mobile telephone system which provides a dedicated WEB area to a mobile telephone set having a browsing function, comprising:
    a WEB server in which the WEB area is secured; and
    an HP forming auxiliary server for building an HP directory file based on an information input from the mobile telephone set to upload the HP directory file to the WEB area of the WEB server,
    wherein the HP forming auxiliary server holds configurations of basic HPs and plural types of patterns of applied images of the basic HPs.

2. A mobile telephone system according to claim 1, wherein the HP forming auxiliary server includes ID detection means for detecting an ID of the mobile telephone set and
    ID determination means for determining whether the ID detected by the ID detection means is an ID which is registered in advance or not, and
    accepts only an information input from the mobile telephone set the ID of which is determined as the ID registered in advance by the ID determination means.

3. A mobile telephone system according to claim 1 or 2, wherein the WEB server accepts only upload from the HP forming auxiliary server.

4. A mobile telephone system according to claim 1, wherein the HP forming auxiliary server causes a phone seller to prepare an advertisement as an HP material and causes a phone purchaser to select the presence/absence of arrangement of the advertisement in formation of an HP directory file based on the information input from the mobile telephone set.

5. A mobile telephone system according to claim 1, comprising a mail server in which an HP forming mail address for accepting a mail for designating formation of the HP directory file is predetermined, wherein
    the HP forming auxiliary server builds the HP directory file based on a mail addressed to the HP forming mail address of the mail server to upload the HP directory file to the WEB area of the WEB server.

6. A mobile telephone system according to claim 1, comprising database means in which an HP material depending on the machine type of the mobile telephone set is stored, wherein
    the HP forming auxiliary server causes the database means to check the machine type of the mobile telephone set and calls an HP material corresponding to the machine type of the mobile telephone set from the database means to provide the HP material to the mobile telephone set.

7. A mobile telephone system according to claim 1, comprising a URL searching server for storing the ID of the mobile telephone set and a URL of the WEB area as a pair and returning the URL of the WEB area in response to an access made by using the ID of the mobile telephone set as a key.

8. A mobile telephone system according to claim 1, comprising an HP information conversion server for converting a first HP directory file read from the WEB server into a second HP directory file having description language information and image format information which are different from those of the first HP directory file.

9. A mobile telephone system according to claim 1, wherein the HP forming auxiliary server sets a text input frame on an HP.

10. A mobile telephone system according to claim 1, wherein the HP forming auxiliary server converts position designation text information input by designating a position from the mobile telephone set into information in an HP description language to build the HP directory file.

11. A mobile telephone system according to claim 1, wherein the HP forming auxiliary server builds the HP directory file from an image, the position of which is designated.

12. A mobile telephone system according to claim 1, wherein the HP forming auxiliary server sets a text input frame on an HP, converts position designation text information input by designating a position from the mobile telephone set into information in an HP description language to build the HP directory file, and builds the HP directory file from an image, the position of which is designated.

13. A mobile telephone system according to claim 1, wherein the HP forming auxiliary server holds information of basic CGIs and has a function that builds the HP directory file by using a CGI in response to an information input from the mobile telephone set.

14. A mobile telephone system according to claim 1, wherein the HP forming auxiliary server transmits an HP forming screen to the mobile telephone set, the HP forming screen accepting information input from the mobile telephone set.

15. A WEB area providing method in a mobile telephone system which provides a dedicated WEB area to a mobile telephone set having a browsing function, wherein
    the WEB area is secured on a WEB server, and
    an HP is built by an HP forming auxiliary server based on an information input from the mobile telephone set to upload the HP to the WEB sever,
    wherein configurations of basic HPs and plural types of patterns of applied images of the basic HPs are held in the HP forming auxiliary server.

16. A WEB area providing method according to claim 15, wherein
    the HP forming auxiliary server detects the ID of the mobile telephone set, determines whether the detected ID is an ID registered in advance or not, and
    accepts only an information input from the mobile telephone set the ID of which is determined as the ID registered in advance.

17. A WEB area providing method according to claim 15 or 16, wherein the WEB server accepts only upload from the HP forming auxiliary server.

18. A WEB area providing method according to claim 15, wherein the HP forming auxiliary server prepares an advertisement as an HP material and selectively arranges the advertisement in formation of an HP directory file based on the information input from the mobile telephone set.

19. A WEB area providing method according to claim 15, wherein an HP forming mail address for accepting a mail for designating formation of an HP directory file is preset in the mail server, and
the HP forming auxiliary server builds the HP directory file based on a mail addressed to the HP forming mail address of the mail server to upload the HP directory file to the WEB area of the WEB server.

20. A WEB area providing method according to claim 15, wherein an HP material corresponding to a machine type of the mobile telephone set is stored in database means, and
the HP forming auxiliary server calls the HP material corresponding to the machine type of the mobile telephone set from the database means to provide the HP material to the mobile telephone set.

21. A WEB area providing method according to claim 15, wherein the ID of the mobile telephone set and a URL of the WEB area are stored as a pair in a URL searching server, and
the URL searching server returns the URL of the WEB area in response to an access made by using the ID of the mobile telephone set as a key.

22. A WEB area providing method according to claim 15, wherein a first HP directory file read from the WEB server is converted by an HP information conversion server into a second HP directory file having description language information and image format information which are different from those of the first HP directory file.

23. A mobile telephone system according to claim 15, wherein a text input frame is set on an HP by the HP forming auxiliary server.

24. A mobile telephone system according to claim 15, wherein position designation text information input is converted by the HP forming auxiliary server by designating a position from the mobile telephone set into information in an HP description language to build an HP directory file.

25. A mobile telephone system according to claim 15, wherein an HP directory file is built from an image, the position of which is designated.

26. A mobile telephone system according to claim 15, wherein a text input frame is set on an HP by the HP forming auxiliary server, position designation text information input is converted by the HP forming auxiliary server by designating a position from the mobile telephone set into information in an HP description language to build an HP directory file, and an HP directory file is built from an image, the position of which is designated.

27. A mobile telephone system according to claim 15, wherein information of basic CGIs is held in the HP forming auxiliary server and an HP directory file is built by using a CGI in response to an information input from the mobile telephone set.

28. A mobile telephone system according to claim 15, wherein an HP forming screen is transmitted to the mobile telephone set, and the HP forming screen accepts information input from the mobile telephone set.

* * * * *